(12) United States Patent
Zhi et al.

(10) Patent No.: US 12,100,835 B2
(45) Date of Patent: Sep. 24, 2024

(54) ZINC-SELENIUM BATTERY COMPATIBLE WITH BOTH ORGANIC AND AQUEOUS ELECTROLYTES

(71) Applicant: CITY UNIVERSITY OF HONG KONG, Kowloon (HK)

(72) Inventors: Chunyi Zhi, Hong Kong (HK); Ze Chen, Hong Kong (HK); Qi Yang, Hong Kong (HK); Xinliang Li, Hong Kong (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 139 days.

(21) Appl. No.: 17/559,738

(22) Filed: Dec. 22, 2021

(65) Prior Publication Data
US 2022/0199979 A1  Jun. 23, 2022

Related U.S. Application Data

(60) Provisional application No. 63/130,189, filed on Dec. 23, 2020.

(51) Int. Cl.
*H01M 4/62* (2006.01)
*H01M 4/36* (2006.01)
*H01M 4/38* (2006.01)
*H01M 4/42* (2006.01)
*H01M 4/587* (2010.01)
*H01M 10/054* (2010.01)
*H01M 10/0568* (2010.01)
*H01M 10/0569* (2010.01)
*H01M 10/36* (2010.01)
*H01M 4/02* (2006.01)

(52) U.S. Cl.
CPC ............. *H01M 4/42* (2013.01); *H01M 4/366* (2013.01); *H01M 4/38* (2013.01); *H01M 4/587* (2013.01); *H01M 10/054* (2013.01); *H01M 10/0568* (2013.01); *H01M 10/0569* (2013.01); *H01M 10/36* (2013.01); *H01M 2004/027* (2013.01); *H01M 2004/028* (2013.01); *H01M 2300/0002* (2013.01); *H01M 2300/0028* (2013.01)

(58) Field of Classification Search
None
See application file for complete search history.

(56) References Cited

FOREIGN PATENT DOCUMENTS

WO  WO 2019/183224  *  9/2019

* cited by examiner

*Primary Examiner* — Laura Weiner
(74) *Attorney, Agent, or Firm* — Conley Rose, P.C.; Michael W. Piper; Andrew M. Metrailer

(57) ABSTRACT

A novel conversion-type rechargeable battery is constructed, the battery using selenium as the cathode material. Preferably, the selenium is coated over the surface of the pores in a mesoporous ion collector such as carbon. A salt of zinc having an organic ion with polar function group is used with the battery, allowing the solvent of the battery to be either organic or aqueous.

1 Claim, 16 Drawing Sheets

(ZnTFSI)

ZINC-SELENIUM BATTERY COMPATIBLE WITH BOTH ORGANIC AND AQUEOUS ELECTROLYTES

CROSS-REFERENCE TO RELATED APPLICATIONS

This application claims priority to U.S. Provisional application No. 63/130,189, filed in the United States Patent and Trademark Office on Dec. 23, 2020 and entitled, "A ZINC-SELENIUM BATTERY COMPATIBLE WITH BOTH ORGANIC AND AQUEOUS ELECTROLYTES", which is incorporated herein by reference in its entirety.

TECHNICAL FIELD OF THE INVENTION

The invention relates to the field of zinc batteries. In particular, the present invention relates to a zinc and selenium battery.

BACKGROUND

A zinc ion battery (ZIBs) is a battery that uses zinc ions ($Zn^{2+}$) as the electrolyte of charge carriers between the battery electrodes. Typically, the anode of the batter is elemental zinc, and a material with a layered-structure suitable for intercalating, or inserting, zinc ions in the electrolyte is used as the cathode.

Zinc-ion batteries can be rechargeable, which sometimes called secondary batteries.

Typically, the zinc ions are provided in aqueous electrolyte solutions, and is deemed safe, easy to assemble and environmentally friendly. However, use of aqueous electrolytes leads to unsatisfactory operating voltage, which is due to the limited thermodynamic potential window of water. Used over time, zinc ion batteries typically have a problem of dendrite formation, as well as electrode corrosion. In addition, there is a possibility of hydrogen evolution from the water in the electrolyte solution. All these problems lead to battery instability and short battery lifespan.

To overcome these problems, "water-in-salt" and hydrate-melt electrolytes have been proposed. However, production these kinds of zinc ion batteries suffer from high production cost and tedious preparation.

It has also been proposed to use organic electrolytes instead of aqueous electrolytes, which comprises organic zinc salts dissolved in an organic solvent. It was hoped that these organic electrolytes could provide an efficient, reversible electrodeposition on the zinc anode with high anodic stability. However, few cathode materials have been found to be useable with zinc anodes in such organic electrolytes. Even then, the few useable cathode materials deteriorate very quickly in use, and are not good for making stable, commercial zinc ion batteries. This is because severe solvation of $Zn^{2+}$ in organic electrolytes can result in the high desolvation penalty together with strong Coulomb repulsion at the cathode interface. In contrast, water performs better in facilitating $Zn^{2+}$ intercalation by easing the desolvation process at the electrolyte/electrode interface.

Therefore, it is desirable to propose a suitable cathode material and/or organic electrolyte that could provide stable, high performing zinc ion batteries. Furthermore, it is also desirable to propose suitable cathode materials applicable both in organic and aqueous battery systems.

STATEMENT OF INVENTION

In a first aspect, the invention proposes a zinc-selenium battery comprising: a zinc anode; and zinc ion electrolytes; wherein the cathode is selenium.

In the half-cell reaction that the cathode, zinc ion is reduced to elemental zinc, and selenium is capable of combining with zinc to form zinc selenide. Surprisingly, it has been found that selenium provides a good cathode material for zinc ion batteries, no matter whether the zinc batteries use organic or inorganic zinc salts as the electrolyte.

Preferably, the cathode comprises a porous structure. For example, the selenium can be made to be a porous structure of pure selenium. This provides a large surface area. A large surface area provides more reaction site for a longer, more reliable discharge process at the cathode.

Preferably, the cathode comprises a carbon-based porous structure; and selenium provided on the surface of the pores. That is, the selenium coats the pores of the porous current collector material. The distribution of selenium over a porous structure provides a possible advantage of greater surface area, compared to that of a solid piece of selenium of similar size.

The meaning of porous includes a solid material having has many small holes made into the solid material, and also tiny rod-like nano-structures defining space between the rods.

A carbon-based porous structure is preferred as carbon is an electron collector. Preferably, the carbon-based porous structure is ordered mesopores carbon composite (CMK-3). Other kinds of nanoporous, microporous, and macroporous carbonaceous materials can be used as skeletal support for the selenium. Besides carbonaceous materials, other conductive material that is inert in the battery system may be used, such as conductive mesoporous silicate, mesoporous cobalt phosphide, mesoporous carbon-silica composites, any other suitable mesoporous carbon composites and so on.

Preferably, the salt of zinc comprises zinc ion and an organic anion. More preferably, the organic anion has polar functional groups, such that the salt can be used dissolved in water or an organic solvent. For example, such organic zinc salts can be $Zn(CF_3SO_3)_2$ or $Zn((CF_3SO_2)_2N)_2$.

$Zn(CF_3SO_3)_2$ also known as zinc trifluoromethanesulfonate, and a common short-hand for $Zn(CF_3SO_3)_2$ is "ZnOTF".

ZnOTF comprises zinc ion that is balanced with an organic ion. The organic ion allows ZnOTF to be soluble in some organic solvents. This provides the possibility of not using water in the battery system and therefore circumventing the problems that come with aqueous zinc batteries, such as production of hydrogen. The preferred concentration of ZnTFSI in an electrolyte solution is 1M.

$Zn((CF_3SO_2)_2N)_2$, also known as zinc bis(trifluoromethylsulfonyl)imide, and a common short-hand for $Zn((CF_3SO_2)_2N)_2$ is "ZnTFSI".

Optionally, therefore, the organic solvent is N, N-dimethylformamide; dimethyl sulfoxide solvent; or a carbonate or nitrile-based solvent; the organic solvent selected from any one of the following:
  a) dimethyl carbonate (DMC);
  b) diethyl carbonate (DEC);
  c) ethylene carbonate (EC);
  d) propylene carbonate (PC);
  e) butylene carbonate (BC);
  f) glycerol carbonate (GyC);
  g) ethyl methyl carbonate (EMC);
  h) acetonitrile;
  i) propionitrile.

Advantageously, a selenium electrode can also work well with an aqueous electrolyte. Furthermore, ZnOTF and ZnTFSI are also soluble in aqueous solvent to provide an aqueous electrolyte. Alternatively, therefore, the electrolyte is aqueous in some embodiments.

Preferably, the aqueous solvent comprises water mixed with a low molecule weight, water-soluble polymer. Typically, the low molecule weight water soluble polymer is polyethylene glycol or poly(ethylene oxide).

For example, therefore, an aqueous electrolyte for the zinc selenium battery is ZnTFSI/polyethylene glycol/water. The preferred concentration is 2M. Typically, the salt is present in the aqueous electrolyte at a concentration from about 0.5 M to about 3 M.

In yet some other embodiments, the zinc salt is inorganic. This is because the zinc-selenium battery can be used with inorganic zinc salts in the electrolyte. For example, the zinc salt may be $ZnSO_4$; $ZnNO_3$; $Zn(ClO_4)_2$ or $ZnCl_2$.

In a further aspect, the invention proposes the novel use of zinc trifluoromethanesulfonate (ZnTFSI) as electrolyte in a battery. In particular, the battery has a selenium cathode. Advantageously, zinc trifluoromethanesulfonate can be used in both organic or aqueous electrolyte.

In a further aspect, the invention proposes the novel use of zinc bis(trifluoromethylsulfonyl)imide as electrolyte in a battery. Preferably, the electrolyte solvent is organic. In particular, the cathode of the battery is selenium.

BRIEF DESCRIPTION OF DRAWINGS

It will be convenient to further describe the present invention with respect to the accompanying drawings that illustrate possible arrangements of the invention, in which like integers refer to like parts. Other embodiments of the invention are possible, and consequently the particularity of the accompanying drawings is not to be understood as superseding the generality of the preceding description of the invention.

DESCRIPTION OF EMBODIMENT(S)

Figure 1:
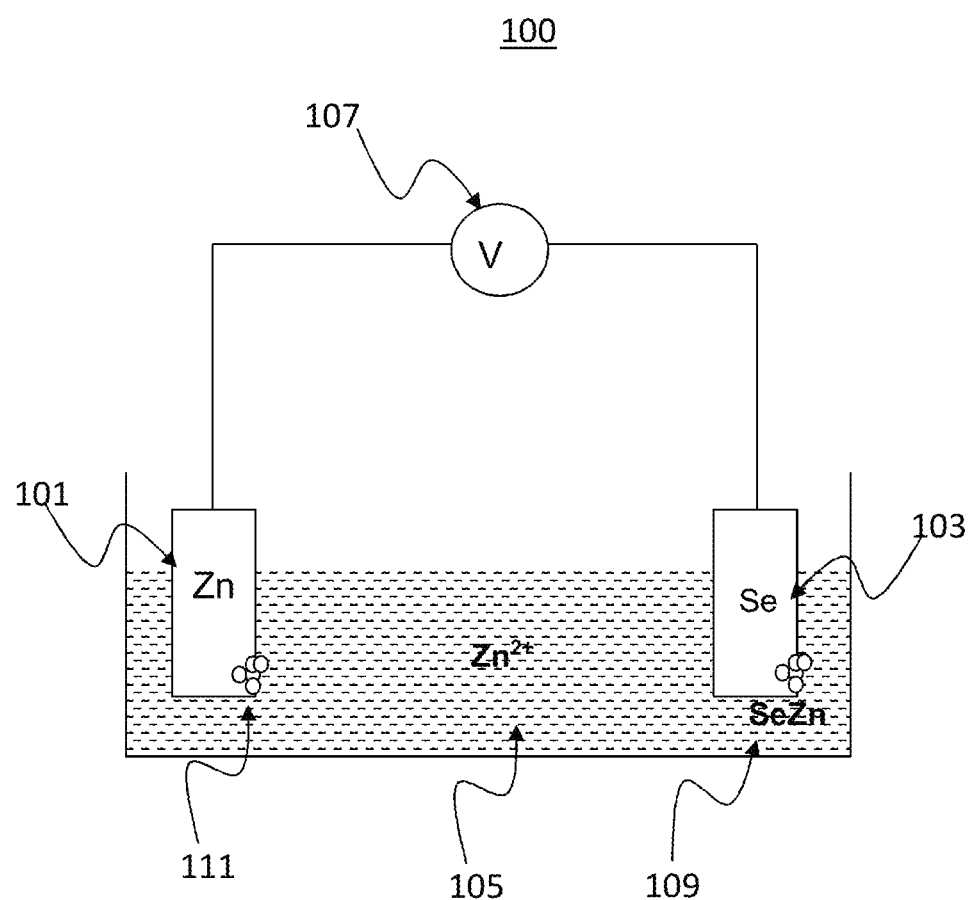
FIG. 1 illustrates schematically an embodiment of the invention, which is a zinc-selenium battery.

FIG. 1 is a schematic diagram of an embodiment 100, which is a battery that has a zinc (Zn) anode 101, a selenium (Se) cathode 103 and zinc ion ($Zn^{2+}$) electrolyte 105. The schematic diagram shows a voltmeter or a load 107 through which a current of electrons yielded by the zinc anode 101 passes during the battery discharge cycle.

Typically, the anode 101 typically comprises a zinc metal plate. Alternatively, the anode 101 is a current collector that is electrochemically deposited with zinc metal on the surface, in which case the deposition time is 60 seconds to 12,000 seconds in most embodiments.

During the discharge cycle of the battery 100, the electrochemical reaction in the battery 100 is as follows.

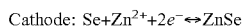

Cathode: $Se + Zn^{2+} + 2e^- \leftrightarrow ZnSe$

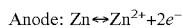

Anode: $Zn \leftrightarrow Zn^{2+} + 2e^-$

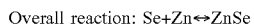

Overall reaction: $Se + Zn \leftrightarrow ZnSe$

In the anode 101, the zinc metal dissolves into the electrolyte 105 to supply electrons. The supply of electrons passes through the load 107 to the selenium. At the same time, the zinc metal is oxidized and produces zinc ions which travel across the electrolyte 105 towards the cathode 103 to form zinc selenide 109 (ZnSe).

In the cathode 103, selenium is reduced from Se to $Se^{2-}$. When $Se^{2-}$ is formed, the $Se^{2-}$ dynamically combines with $Zn^{2+}$ in the electrolyte 105 to form the ZnSe.

Figure 2:
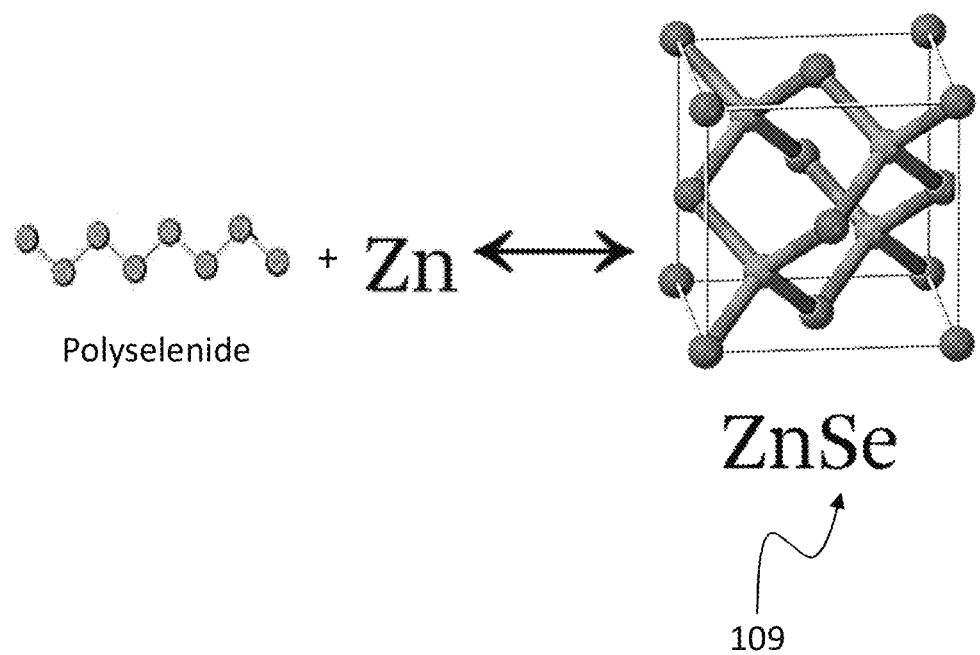
FIG. 2 illustrate the conversion mechanism of the battery of FIG. 1.

FIG. 2 illustrates the reversible reaction of zinc selenide 109 formation in greater detail. During the discharge cycle, the reaction goes from left to right of the illustrated reaction at the cathode 103, where zinc ions merges with selenide to form zinc selenide 109. Typically, the selenium is in the form of long chains of polyselenide, and the zinc selenide 109 typically has a cubic structure (cubic structure image taken from Wikipedia).

During the charging cycle, the reaction illustrated in FIG. 2 reverses and goes from right to left, and zinc selenide 109 reverts into zinc ions and polyselenide chains.

In the simple embodiment illustrated in FIG. 1, during the charging cycle, zinc selenide 109 may be deposited on the surface of the selenium cathode 103. This is undesirable as the deposit can reduce the area of selenium exposed to the electrolyte 105 significantly, and can also cause physical deformation of the cathode 103. On the other hand, during the charging cycle, zinc ions are reduced and are deposited as zinc onto the zinc electrode. This forms dendrites 111 on the zinc electrode 101, which could reduce the efficiency of the zinc electrode 101 and also cause electrode deformation.

Figure 3:
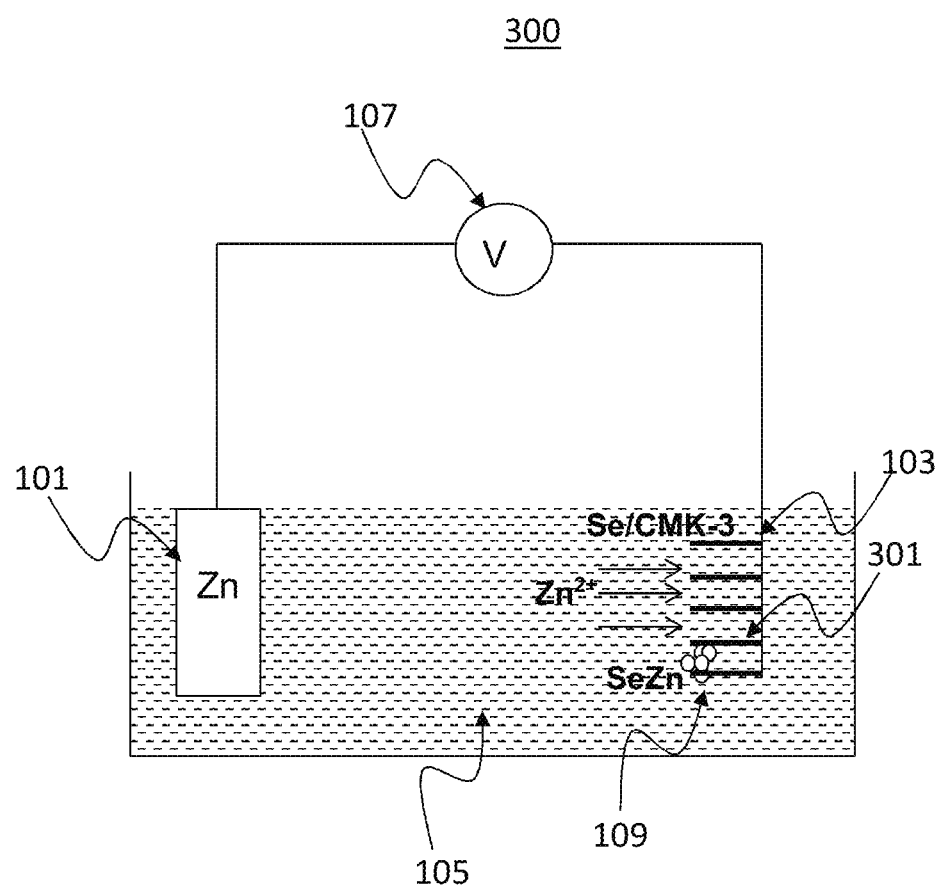
FIG. 3 illustrates a further embodiment, alternative to the embodiment of FIG. 1.

To reduce or overcome the problem of zinc selenide deposits on the selenium electrode, a second embodiment 300 is proposed, which is illustrated in FIG. 3. FIG. 3 shows that the cathode selenium is provided infused and embedded into a porous structure 301. A porous structure provides an internal large surface area-to-volume ratio. As a result, selenium is coated and spread over a large surface area, with which the electrolyte 105 can react more quickly than with a smaller surface area.

The preferred porous structure is one which is inert in the battery 100 environment and is also electrically conductive. More preferably, however, the mesoporous structure is a carbon-based current collector, such as ordered mesoporous carbon. Ordered mesoporous carbon is also written as CMK-3.

A mesoporous material is also known as a super-nanoporous material, and generally contains pores with diameters usually between 2 nm and 50 nm. A porous material with pores smaller than 2 nm is said to be microporous, and a porous material with pores larger than 50 nm is said to be macroporous.

Besides CMK-3, there are many types of carbon materials that can be used to provide the porous structure 301, such as modified CMK-3, written as MCMK-3, or ordered mesoporous carbon (CMK-5) and so on. Carbon based porous material is preferred as carbon is electrically conductive. Besides carbon, however, any other mesoporous current collecting material that the selenium may be embedded in can be used, provided that the material is inert with regards to the other materials used in the battery 300. For example, conductive mesoporous silicate or mesoporous cobalt phosphide can be used.

Figure 4A:
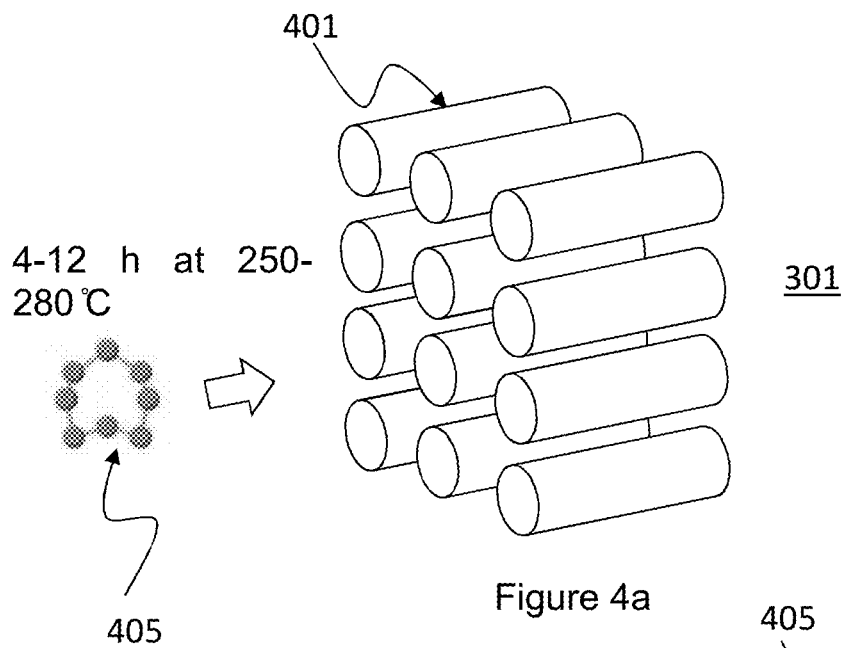
FIG. 4a and FIG. 4b illustrates the coating process of a porous material with selenium
Figure 4B:
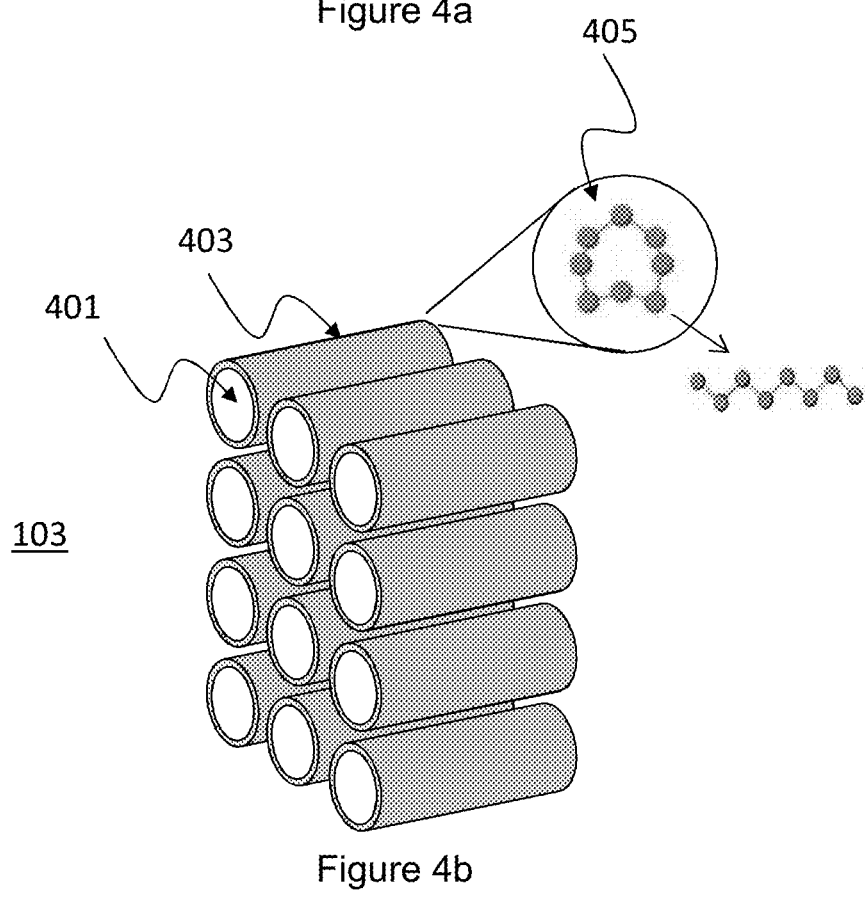

The meaning of porous includes a solid material having has many tiny holes made into the solid material, and also a solid material comprised of tiny rod structures defining space between the rods. Accordingly, FIG. 4a illustrates the structure of CMK-3 material as nano-sized rods 401. Selenium is deposited over the nano-size carbon rods by melting selenium at 250-280° C. and allowing the selenium to infuse through the nano-sized rods to coat the rods. Typically, the infusion time can be 4-12 h depending on the size of the cathode 103. The infusion temperature is 250-280° C. FIG. 4b illustrates the nano-size carbon rods 401 coated with selenium 403. Liquid electrolyte 105 is able to flow into the space between the coated rods 401 into contact with the selenium coating 403.

Advantageously, the large surface area of selenium 403 distributed over the porous structure 301 prevents zinc selenide deposits from easily and quickly covering a significantly large area of the cathode 103. A large surface area of selenium probably remains exposed to react with the zinc ions even after long discharge hours. This also helps to prevent the volumetric distortion by reducing the likelihood of deposit build-up on the cathode 103 surface.

Furthermore, using a selenium 403 coated porous structure 301 as cathode 103 has an advantage of reducing the "shuttle effect". The 'shuttle effect' refers to the repetitive diffusion of polyselenide forward and back between the anode 101 and cathode 103 over repetitive charging and discharging. The shuttle effect can cause poor cycle stability. That is, in the present embodiment, when zinc selenide breaks up into zinc ions and polyselenide during the charge cycle, the polyselenide remains largely retained in the porous structure 301 instead of being freely attracted to travel towards the anode 101. In this way, some polyselenide is readily present in cathode 103 to be converted back into zinc selenide during the start of the next discharge cycle.

Figure 5:
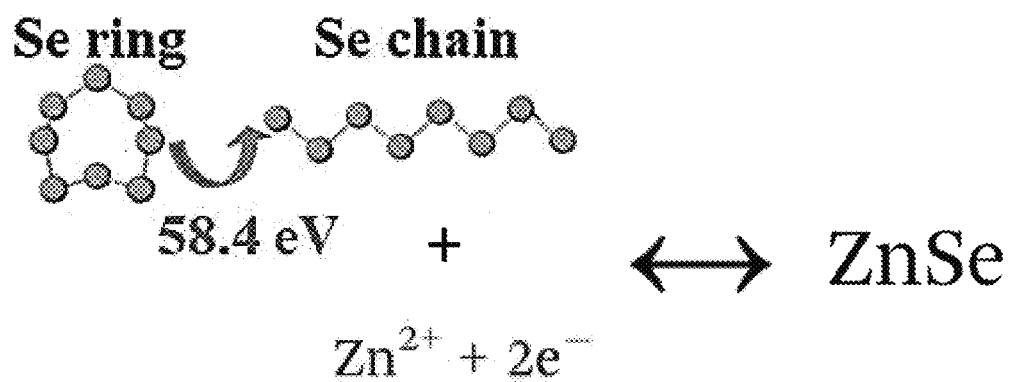
FIG. 5 illustrates the conversion mechanism of zinc selenide in greater detail than that illustrated in FIG. 2.

As the skilled man would know, selenium exists in several allotropic forms, one of which is polyselenide in the ring form of $Se_8$ 405. This is the form of selenium infusing the CMK-3 material. However, the ring form of polyselenide exists only up to the first time the battery 300 is discharged, at which point of time the polyselenide ring opens up onto amorphous chains of poly selenide, which is then able to form zinc polyselenide. FIG. 5 illustrates in greater detail this chemical reaction which takes place on the surface of the porous structure 301. It is proposed that the mechanism of the conversion lies basically in the form of amorphous polyselenide, when $Se_0$ is converted to $Se_2$. With continuous current discharge, the amorphous, chain-like $Se_8$ is gradually consumed and becomes ZnSe. Subsequently, in the charge process, ZnSe becomes chain-like $Se_8$ again. However, the zinc selenide reverts only to the chain form of polyselenide and does not close up into the ring form again. Accordingly, the reversible charge and discharge reaction is only between the chain form of the polyselenide and zinc selenide.

The electrolyte 105 of the battery 300 is preferably zinc bis(trifluoromethylsulfonyl)imide (ZnTFSI), a salt having the chemical formula $Zn((CF_3SO_2)_2N)_2$.

An alternative salt to ZnOTF is $Zn(CF_3SO_3)_2$.

Figure 6:
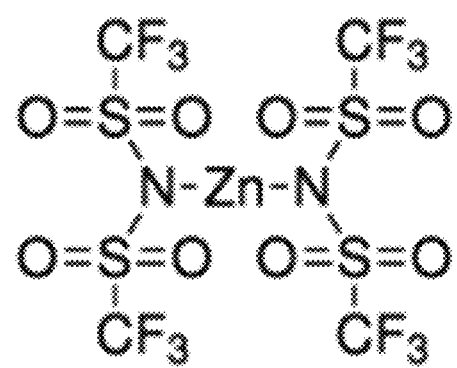
FIG. 6 shows the structure of the preferred electrolyte for the embodiments of FIG. 1 and FIG. 3.

FIG. 6 shows the structure of ZnTFSI. The $CF_3$ part of the anion provides solubility in some organic solvents, while the $SO_3$ provides some degree of solubility in aqueous solvents. Therefore, ZnTFSI can be used in the zinc selenium battery 300 dissolved in either organic solvents or aqueous solvents.

Preferred organic solvents includes ethyl methyl carbonate (EMC), dimethyl sulfoxide (DMSO) and acetonitrile (AN).

It has been found that EMC, AN or DMSO based ZnTFSI electrolytes all show a superior plateau capacity contribution over prior art zinc ion batteries, i.e. at 79.2%, 57.6% and 36.9%, respectively. In particular, 1 M ZnTFSI in EMC has been found to have a capacity of up to 551 mAh $g^{-1}$ is achieved at 0.1 A $g^{-1}$ In general, Zn—Se battery 300 performance based on an EMC electrolyte 105 is the best among the organic solvent choices of EMC, DMSO and AN. Possibly, this is because EMC based batteries can be charged to a higher voltage (2.2 V) due to the higher anodic stability than those of AN or DMSO, accompanied by competitive Warburg diffusion resistance, ion diffusion coefficients and ion conductivity.

It has also been found that $Zn^{2+}$ exhibits a much lower solvent free energy in the EMC based electrolyte, than that in AN or DMSO. This provides the possibility of better electrochemical performance in a ZnSe battery having an EMC based electrolyte.

It has been found that in the initial 100 charge and discharge cycles of Zn—Se batteries at a current density of 0.1 A $g^{-1}$ based on different electrolytes, superior capacity retentions were obtained, i.e. 89.1% from EMC based electrolyte, 68.3% from AN based electrolyte and 65.4% from DMSO based electrolyte.

The cycling performance obtained with EMC based electrolyte is the best among these and results mainly from carbonate solvents being able to greatly reduce the dissolution of polyselenide discharging intermediates. Accordingly, it has been observed that significantly less amount of polyselenide can be detected on the surface of the zinc electrode and also in the organic electrolyte of the present embodiment 300.

Furthermore, use of the organic solvents provides the possibility of good cycling performance by reducing zinc dendrites formation, resulting in a highly stable zinc anode 101.

Advantageously, the selenium cathode 103 described also provides the possibility of being used with aqueous electrolytes 105. This opens up the options for designing different grades and configurations of zinc ions batteries.

In particular, the salt ZnTFSI can be dissolved in aqueous solvents to provide the aqueous electrolyte 105. Examples of aqueous electrolytes make-up include 1 M ZnTFSI in water, and 2 M ZnTFSI in polyethylene glycol (PEG) and water. Use of ZnTFSI in PEG and water is particularly advantageous as PEG is able to extend the voltage window of the aqueous electrolyte 105.

Figure 7:
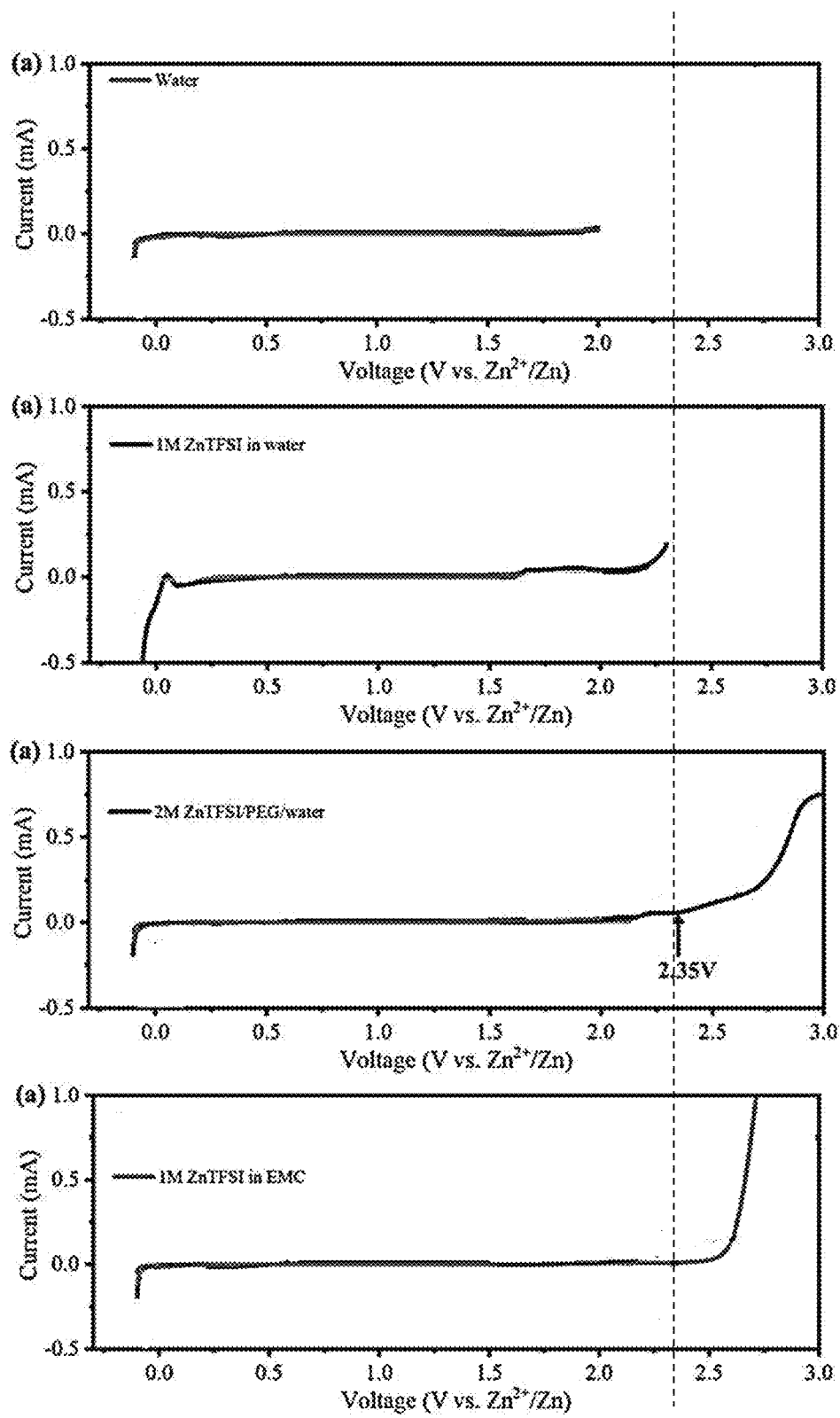
FIG. 7 illustrates the performance of Zn—Se batteries using aqueous ZnTFSI.

FIG. 7 illustrates the performance of Zn—Se batteries using aqueous ZnTFSI. FIG. 7 shows that 1M ZnTFSI dissolved in water (second graph counting from the top) has a clearly improved anodic stability over the anodic stability of the zinc selenium battery in just water (top graph).

The third graph from the top in FIG. 7 shows that when 2M ZnTFSI is provided in aqueous PEG, there is also an improved anodic stability (up to 2.35 V). This indicates that the presence of PEG in the molecular crowding of the aqueous electrolyte 105 successfully suppressed the decomposition of water at a low salt concentration, i.e. the 2 M ZnTFSI.

The bottom graph of FIG. 7 shows that 1M ZnTFSI in EMC has the best anodic stability, at beyond 2.35V.

Figure 8:
FIG. 8 is a photograph of a prototype of the embodiment of FIG. 3.

FIG. 8 shows a battery pack prototype 800 made according to an embodiment of the invention, such as the embodiment 300 of FIG. 3. The top of the battery pack is provided with the battery terminals 801 for connecting to a circuit.

Figure 9:
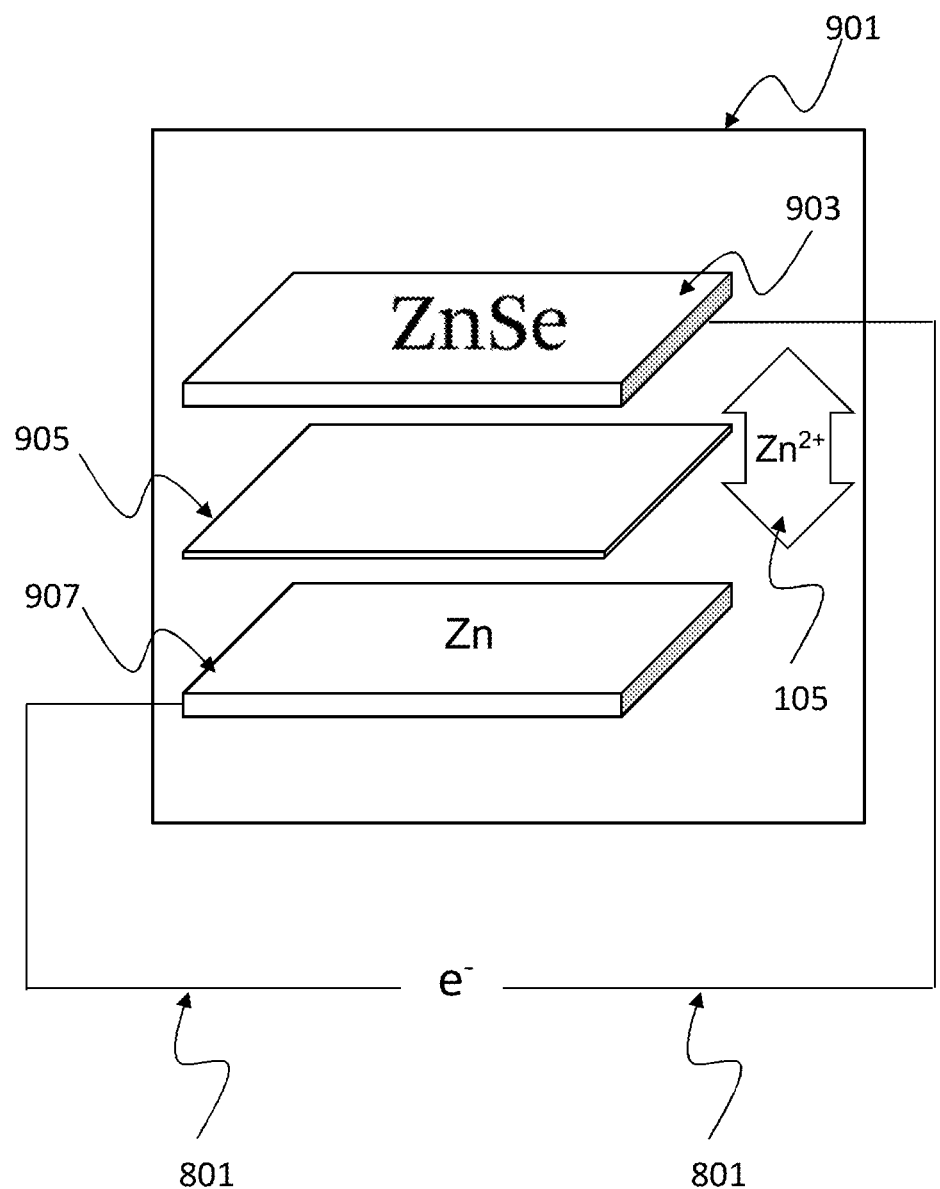
FIG. 9 is a schematic exploded view of the prototype of the embodiment of FIG. 3.

FIG. 9 is an exploded, schematic view of the battery pack 800 shown in FIG. 8. Inside the battery pack there is a planar sheet of CMK-3 infused with selenium 903 for a cathode 103, a zinc planar sheet 907 for an anode 101, these electrodes are separated by a separator 905. Plastic packaging material 901 is provided around the layers to produce the battery pack. Carbon nanotube paper or carbon cloth is selected as the battery terminals 801. The package is filled with the preferred zinc electrolyte 105, which can be organic or aqueous.

While there has been described in the foregoing description preferred embodiments of the present invention, it will be understood by those skilled in the technology concerned that many variations or modifications in details of design, construction or operation may be made without departing from the scope of the present invention as claimed.

For example, the zinc salt can be any other suitable salt. If the electrolyte solvent is organic, the zinc salt is an organic salt. Examples of other organic zinc salts include $Zn(CF_3SO_3)_2$ and $Zn((CF_3SO_2)_2N)_2$. If the electrolyte solvent is inorganic or aqueous, the zinc salt is inorganic. Examples of inorganic zinc salts include $ZnSO_4$; $ZnNO_3$; $Zn(ClO_4)_2$ or $ZnCl_2$.

Furthermore, besides dimethyl carbonate (DMC), other similar organic solvents may be used to dissolve the organic zinc salt, such as diethyl carbonate (DEC); ethylene carbonate (EC); propylene carbonate (PC); butylene carbonate (BC); glycerol carbonate (GyC); or ethyl methyl carbonate (EMC).

Experimental Data and Observation

Figure 10A:
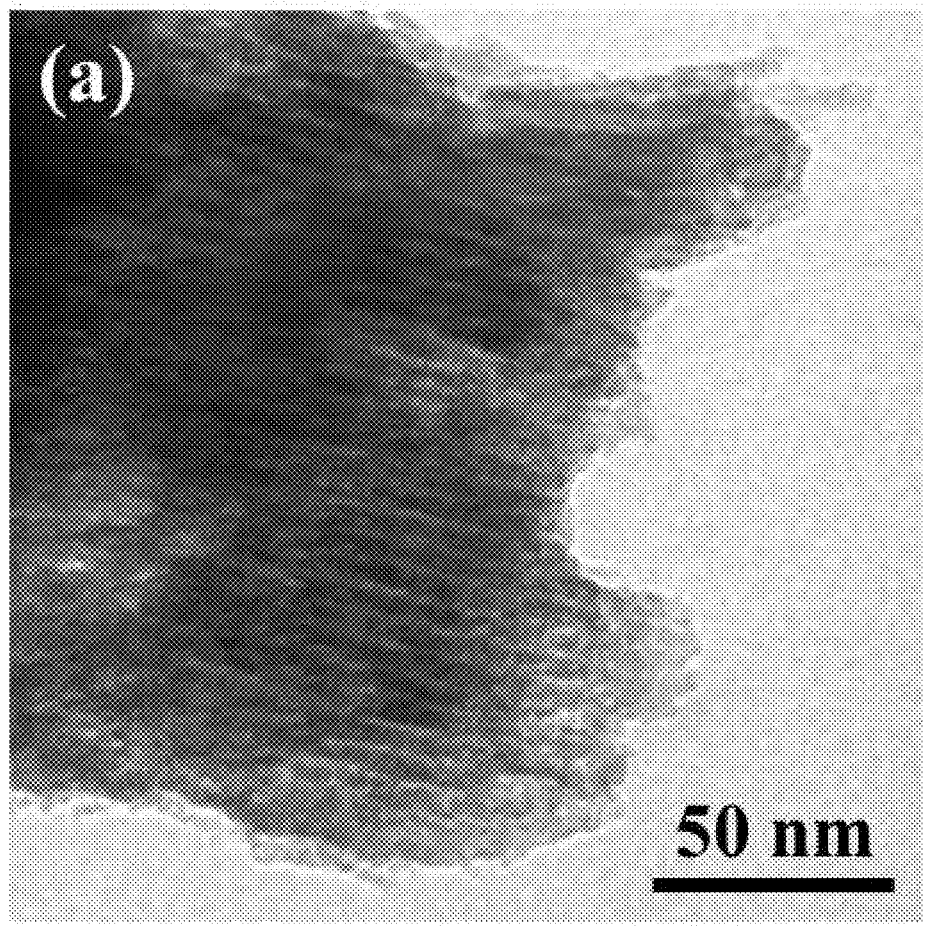
FIG. 10a to FIG. 10c are each an SEM picture of CMK-3 into which selenium is deposited, that could be seen in an embodiment such that of FIG. 3; and FIG. 11a to FIG. 11f illustrates the discharge/charge cycles that could be seen in an embodiment such that of FIG. 3.

As observed from transmission electron microscopy (TEM) images of the Se/CMK-3 composite (FIG. 10a), the morphology of the Se/CMK-3 composite showed micrometer-sized, rod-like particles, and most of the highly ordered arrangement of cylindrical mesoporous channels of CMK-3 was homogeneously infiltrated with Se.

Figure 10B:
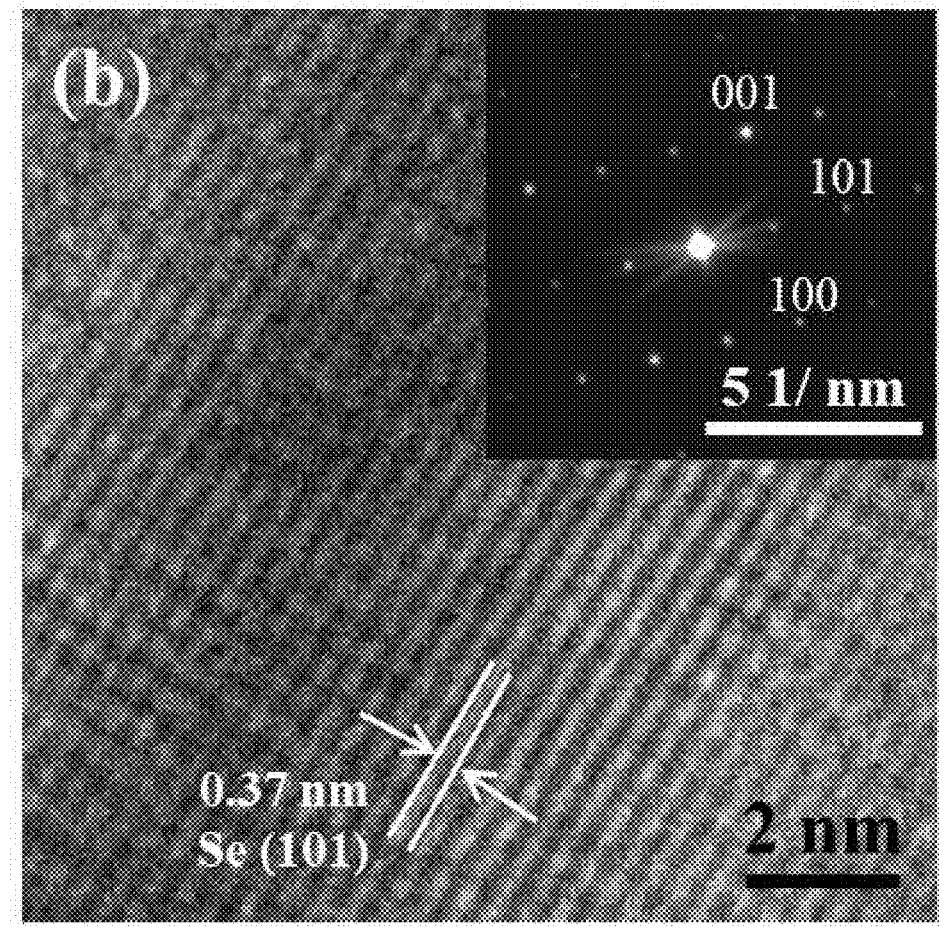

A clear crystal lattice spacing of B3.7 in the corresponding high resolution TEM (HRTEM) image of the Se/CMK-3 composite in FIG. 10b is assigned to the (101) plane of Se.27

Figure 10C:
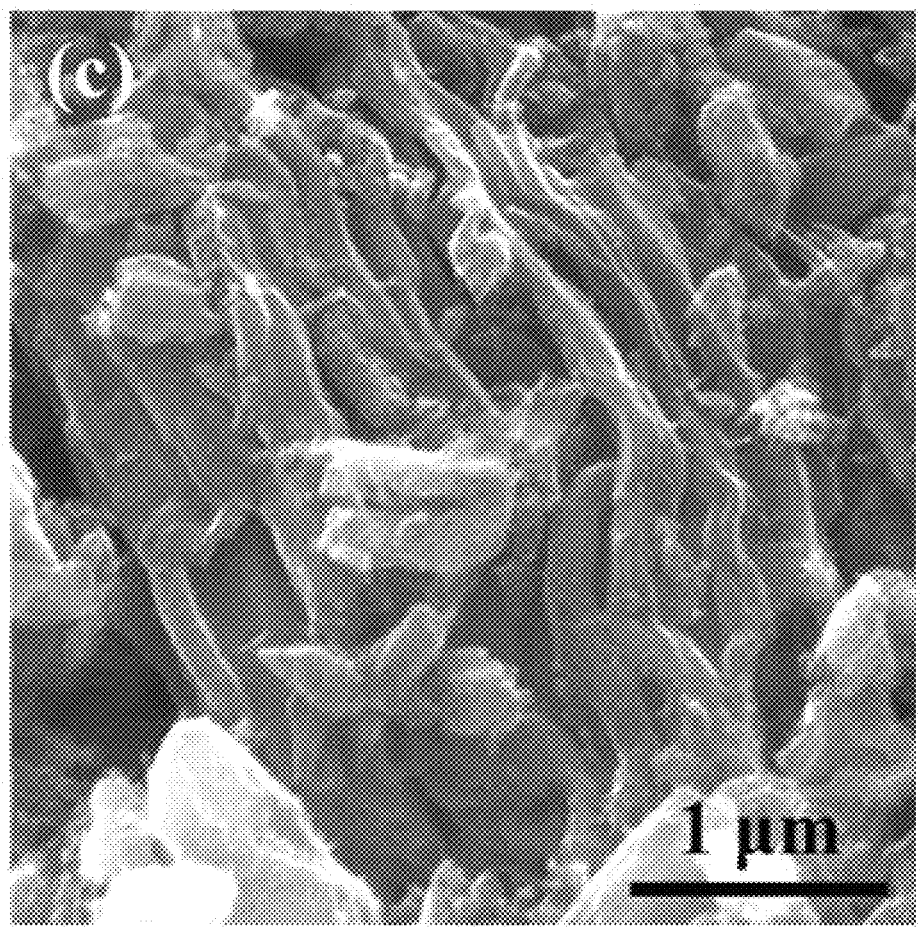

In addition, the obvious and strong selected area electron diffraction (SAED) pattern (inset of FIG. 10b) demonstrates that the crystalline features of Se were retained after being encapsulated into CMK-3. In addition, almost no residual bulk Se can be found on the surface of the CMK-3, which indicates that the infiltration of Se is thorough and uniform (FIG. 10c).

To investigate the $Zn^{2+}$ storage mechanism in the Se electrode, chemical conversion and the concomitant phase evolution was investigated by ex situ XRD.

Figure 11A:
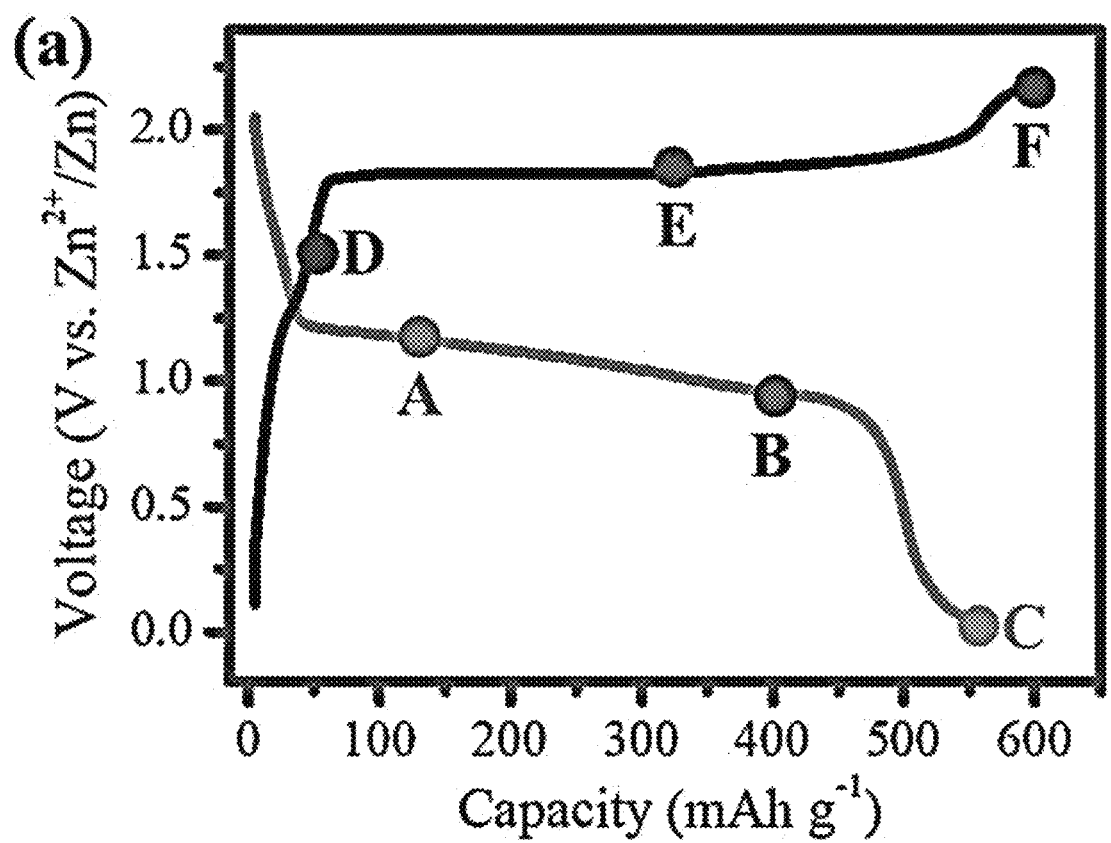

The different spheres shown in FIG. 11a mark the potential of the second discharge/charge cycle.

Figure 11B:
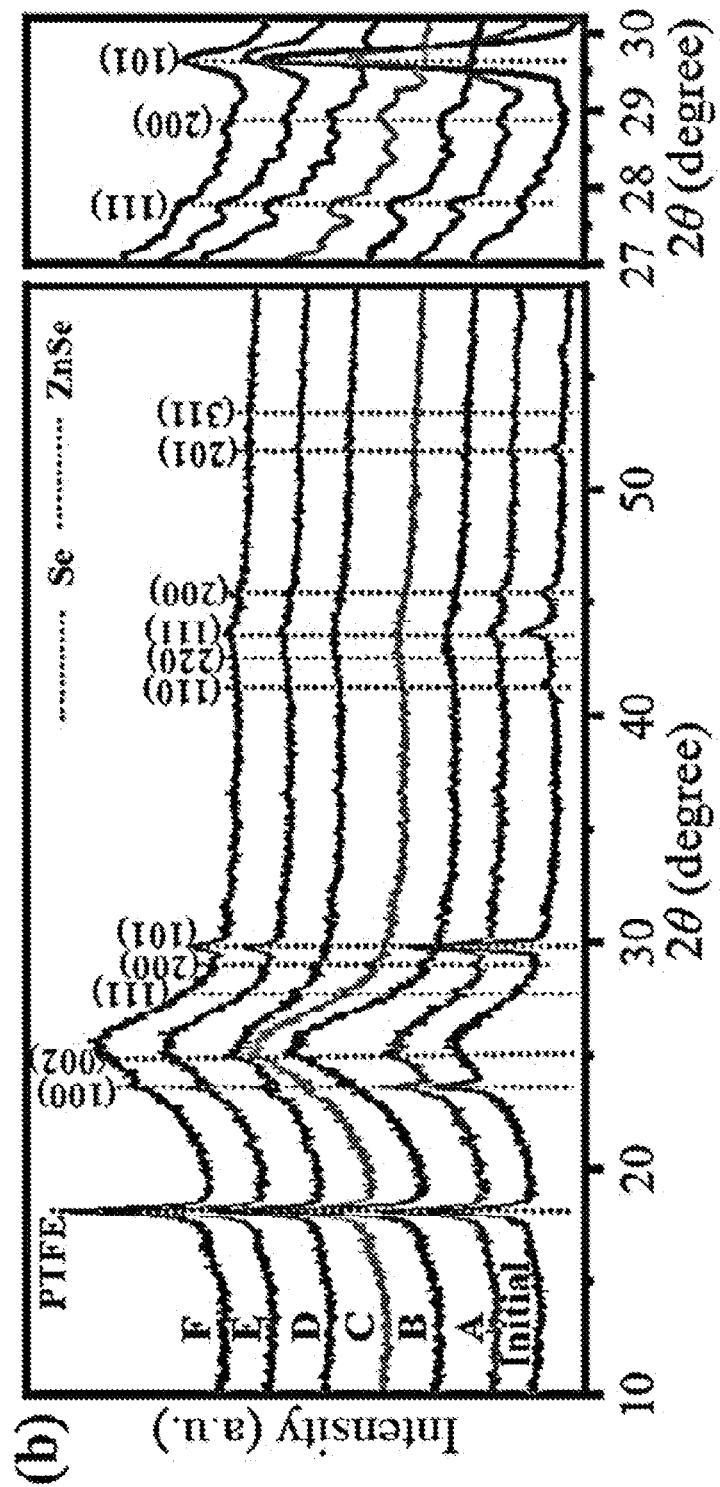

As shown in FIG. 11b, when the Se/CMK-3 electrode is discharged to 1.0 V (point B), the characteristic peaks of Se at 23.6° (100), 29.6° (101) and 43.7° (111) almost disappear, accompanied by the presence of new peaks at 24.9°, 27.7°, 44.9° and 53.6°. These new peaks can be attributed to ZnSe phase structures of (002), (111), (220) and (311), respectively. When being discharged to 0.05 V (point C), the characteristic peaks of Se almost disappear completely. This indicates a high conversion from Se to ZnSe, which corresponds to the high capacity of the Se cathode.

When being charged, ZnSe is gradually converted back into Se, which is confirmed by the gradual intensity increase of the characteristic Se peaks such as that for (101). Furthermore, ex situ XPS was used to examine the redox process of the Se cathode at different discharge states (initial, 1.15 V, 1 V and 0.05 V) and charge states (1.5 V, 1.85 V and 2.2 V).

Figure 11C:
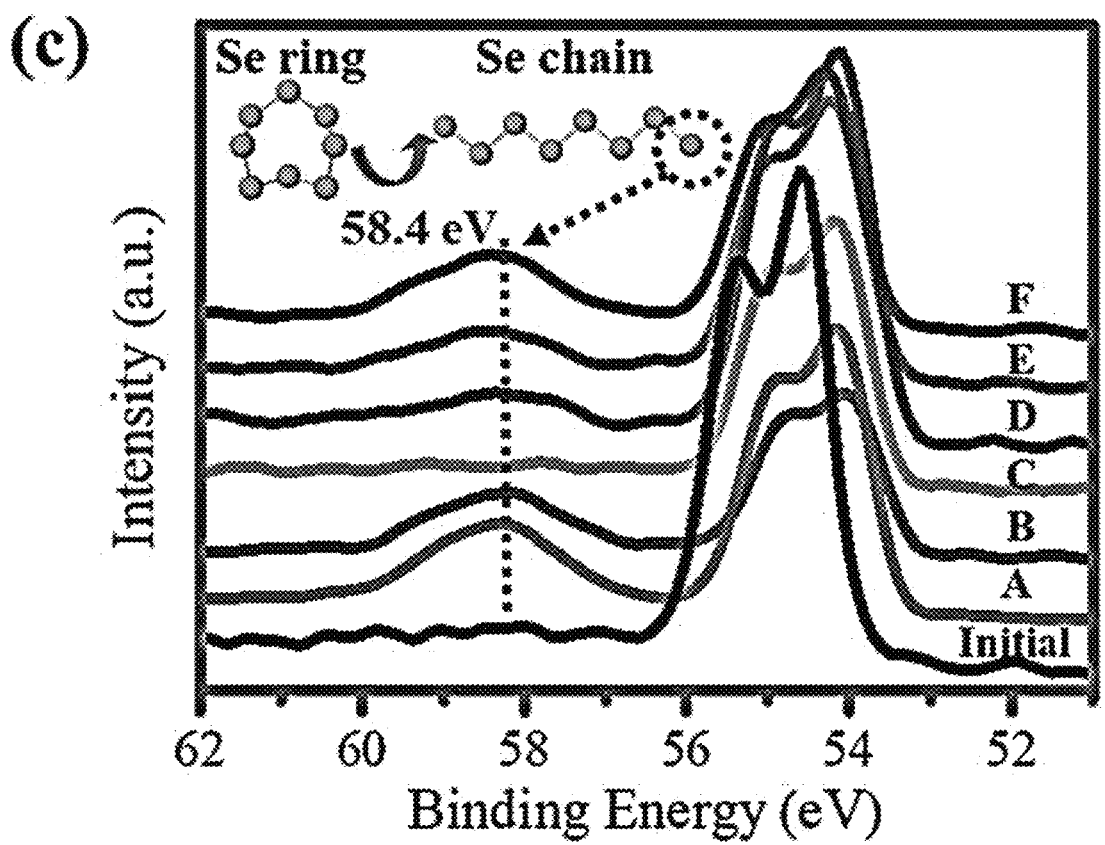

Firstly, compared with the Se 3d peaks at the initial state, a new peak emerges at 58.4 eV at the discharge state of 1.15 V (FIG. 11c). This can be attributed to the irreversible transformation of ring-like $Se_8$ into chain-like $Se_8$ in the carbon matrix. After that, Se exists in an amorphous phase. It also can be confirmed by the XRD pattern at the charged state (curve F in FIG. 11b), in which the peak intensity dramatically decreases compared with the Se electrode at the initial state. With continuous discharge, the amorphous, chain-like $Se_8$ is gradually consumed, shown by the peak intensity decrease at 58.4 eV.

Figure 11D:
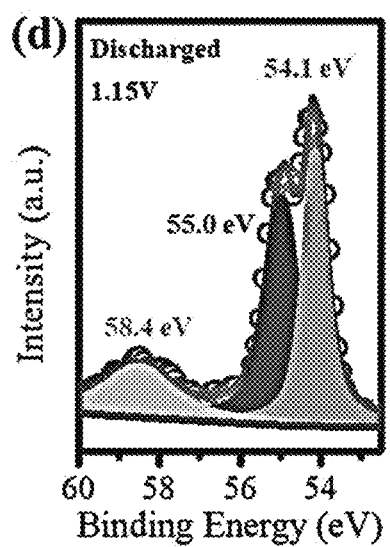
Figure 11E:
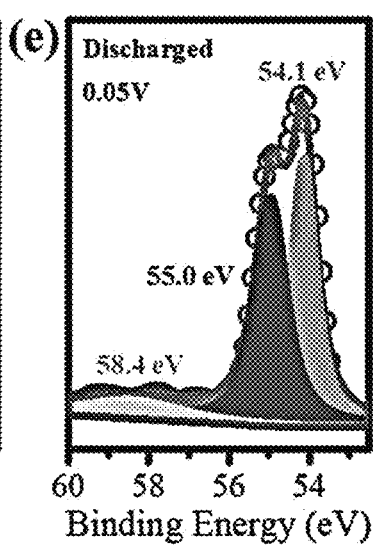
Figure 11F:
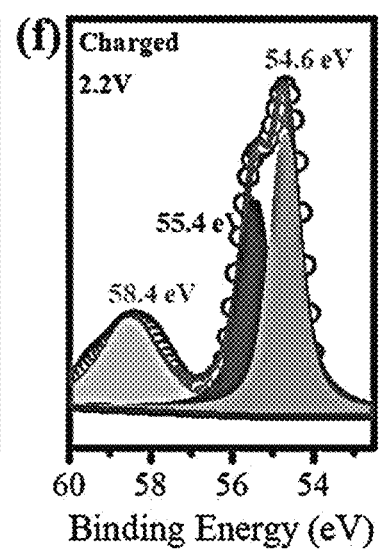

In the discharging process, the peak positions of Se 3d at 55.4 and 54.6 eV migrate to 55.0 and 54.1 eV, respectively, which results from the conversion of $Se_0$ to $Se_2^-$ (FIG. 11d and FIG. 11e). Following the charge process, the peak intensity of chain-like $Se_8$ increases and the peak positions of Se 3d shift back, indicating a reversible reaction (chain-like $Se_8 \leftrightarrow ZnSe$) in the Zn—Se battery (FIG. 11f).

From ex situ Raman spectra of the Zn—Se batteries (not shown), an obvious transformation of chain-like $Se_8$ to chain-like $Se_n$ to ZnSe can be observed during the discharge process, which indicates that the long plateau has a two-step conversion. When being charged back to 1.7 V, part of ZnSe can be transformed to chain-like $Se_n$, and both the residual ZnSe and chain-like $Se_n$ can be totally converted to chain-like $Se_8$.

Based on the results of the ex situ XRD (not shown here), ex situ XPS (not shown here), ex situ Raman (no shown here) and TEM (not shown here), the electrochemical reaction process of the Zn—Se battery with the EMC organic electrolyte can be summarized as below:

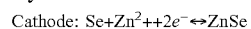
Cathode: $Se + Zn^{2+} + 2e^- \leftrightarrow ZnSe$

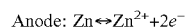
Anode: $Zn \leftrightarrow Zn^{2+} + 2e^-$

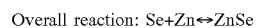
Overall reaction: $Se + Zn \leftrightarrow ZnSe$

The invention claimed is:

1. A zinc-selenium battery consisting essentially of:
a zinc anode;
a cathode consisting essentially of selenium active material supported on an ordered mesopores carbon composite electron current collector; and
an electrolyte solution consisting essentially of ethyl methyl carbonate and a $Zn((CF_3SO_2)_2N)_2$.

* * * * *

UNITED STATES PATENT AND TRADEMARK OFFICE
CERTIFICATE OF CORRECTION

PATENT NO. : 12,100,835 B2
APPLICATION NO. : 17/559738
DATED : September 24, 2024
INVENTOR(S) : Zhi et al.

Page 1 of 1

It is certified that error appears in the above-identified patent and that said Letters Patent is hereby corrected as shown below:

In the Claims

Column 8, Claim 1, Line 60, cancel the text:
"methyl carbonate and a Zn((CF3SO2)2N)2."
And insert the following:
--methyl carbonate and a Zn((CF3SO2)2N)2 salt.--

Signed and Sealed this
Third Day of December, 2024

Katherine Kelly Vidal
*Director of the United States Patent and Trademark Office*